(12) United States Patent
Adams et al.

(10) Patent No.: US 8,495,566 B2
(45) Date of Patent: Jul. 23, 2013

(54) WIDGET COMBOS: A WIDGET PROGRAMMING MODEL

(75) Inventors: Samuel S. Adams, Yorktown Heights, NY (US); Rachel K. E. Bellamy, Yorktown Heights, NY (US); Jonathan P. Brezin, Yorktown Heights, NY (US); John T. Richards, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 12/510,803

(22) Filed: Jul. 28, 2009

(65) Prior Publication Data

US 2011/0029949 A1 Feb. 3, 2011

(51) Int. Cl.
*G06F 9/44* (2006.01)

(52) U.S. Cl.
USPC ............ 717/109; 717/105; 717/113; 719/328

(58) Field of Classification Search
USPC ... 715/700–866; 717/100–167; 709/221–227; 719/315–330
See application file for complete search history.

(56) References Cited

U.S. PATENT DOCUMENTS

| | | | |
|---|---|---|---|
| 5,600,780 A | 2/1997 | Hiraga et al. | |
| 5,603,034 A * | 2/1997 | Swanson | 717/111 |
| 5,786,815 A | 7/1998 | Ford | |
| 6,857,124 B1 * | 2/2005 | Doyle | 719/316 |
| 2003/0135841 A1 * | 7/2003 | Ambrose et al. | 717/120 |
| 2003/0159129 A1 | 8/2003 | Frank et al. | |
| 2005/0125787 A1 | 6/2005 | Tertitski et al. | |
| 2005/0193368 A1 | 9/2005 | Becker et al. | |
| 2006/0005207 A1 | 1/2006 | Louch et al. | |
| 2007/0011620 A1 * | 1/2007 | Mendel et al. | 715/762 |
| 2008/0148283 A1 * | 6/2008 | Allen et al. | 719/316 |

OTHER PUBLICATIONS

Paul Deitel and Harvey Deitel, Visual Basic® 2005 for Programmers: Deitel® Developer Series, 2006, Prentice Hall, Second Edition, Chapter 2.*

* cited by examiner

*Primary Examiner* — Wei Zhen
*Assistant Examiner* — Satish Rampuria
(74) *Attorney, Agent, or Firm* — Scully, Scott, Murphy & Presser, P.C.; Eustus D. Nelson, Esq.

(57) ABSTRACT

A system and method that can be used to create a new API via a combination of existing APIs, e.g., given a set of existing APIs. The system and method also allow the user to remove existing API elements from the generated API, and to add new API elements to the generated API.

18 Claims, 5 Drawing Sheets

WIDGET COMBOS: A WIDGET PROGRAMMING MODEL

BACKGROUND

The present disclosure generally relates to creation of a new application programming interface (API), and particularly to, a system and method that can generate a new API from existing APIs.

Widgets are small desktop applications typically implemented using Web 2.0 technologies such as extended markup language (XML) and Javascript™. While widgets are useful tools, in order to be able to reuse those codes, for instance, in a different computing environment or with slight modifications, a programmer or a user needs to modify the widgets.

U.S. Patent Publication No. 2006/0005207 provides an authoring environment for authoring consistent widgets. U.S. Pat. No. 5,786,815 provides a method facilitating modification of an application's graphical user interface. U.S. Pat. No. 5,603,034 provides a method for selectively customizing graphical resources of a software application. U.S. Patent Publication No. 2005/0125787 provides a method for modifying the graphical user interface without access to the application source code.

BRIEF SUMMARY OF THE INVENTION

A method and system for creating an API for a widget (also referred to here as a code module) to be used in a computer system are provided. The method, in one aspect, may include creating a new module by composing one or more existing modules and defining an API for the new module using a set of API elements of said one or more existing modules.

A system for creating an API for a code module to be used in a computer system, in one aspect, may include a user interface comprising a frontstage component, a backstage component and a list of existing modules from which one or more existing modules are selected to create a new module. The frontstage component may include the new module being created. An "add combo" to frontstage handler is operable to add a combo to a list of combos for creating said new module in the frontstage component. Further handlers are operable to add, or remove, one or more API element associated with the combo to a list of APIs in the frontstage component for creating said new module. An "add combo" to backstage handler is operable to add said new module to a list of combos in the backstage component. A "new combo" handler is operable to open an empty list of combos in the frontstage component, an empty list of APIs in the frontage component, and an empty list of combos in the backstage component. A "save combo" handler is operable to save said new module to a data store. A "remove API element" handler is operable to remove one or more API elements from the list of APIs in the frontstage component.

A program storage device readable by a machine, tangibly embodying a program of instructions executable by the machine to perform the methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

Programmers create reusable code modules which can be reused in other programs. These code modules have APIs, which define the interface that another programmer can use. Generally, an API is an interface to a reusable code module that a programmer can use. That is, an API is a way in which a program can communicate with another program, for example, for service requests and the like. Among other things, an API defines the properties, methods, documentation and data-files for the program module or software to communicate (i.e., interface) with another program module or software. The present disclosure describes a system and method that create a new API from a combination of existing APIs, e.g., given a set of existing APIs. The system and method also allow the user to remove existing API elements from the generated API, and to add new API elements to the generated API. An API element is a part of an API, for example, a parameter or a constant that would be part of the API definition. An API specifies an interface and the behavior of the identifiers specified in that interface; it does not specify how the behavior may be implemented. An API is usually defined by an extensive list of functions and classes and variables. It is used for accessing an application or a service from a program. DirectX™ is a collection of games programming APIs. GoogleMaps™ is an example of an API to a web service. An API makes it possible to use programs from within programs, therefore it may be considered as the foundation for modular systems with clearly defined interfaces between separate components.

A widget is a small application program that performs a given functionality. An example may be a weather application that is on a Windows™ desktop, which provides weather information. In the present application the term "widget" refers to a code module or an application such as a mini application. Those terms are used interchangeably in the present disclosure. A "combo" or "combo API" in this application refer to a combination of a code module and an API. A new API may be created from a combo API.

A user interface program may be provided that allows a user, programmer or the like to create a new API from a combo API. In the user interface program, a combo has a frontstage and a backstage, for example, shown as windows or panels or the like in the user interface. A frontstage component shows a currently open widget with an API that is being modified. A list of existing combos, for example, shown as a palette, and previously saved combos is provided as part of a composer module or the like of the present disclosure that is used to compose a new API. A backstage component includes existing combos and previously saved combos. Any API elements that are on the frontstage and are enabled (e.g., by a check in a check box) are saved as the API of the combo when the combo is saved.

Figure 5:
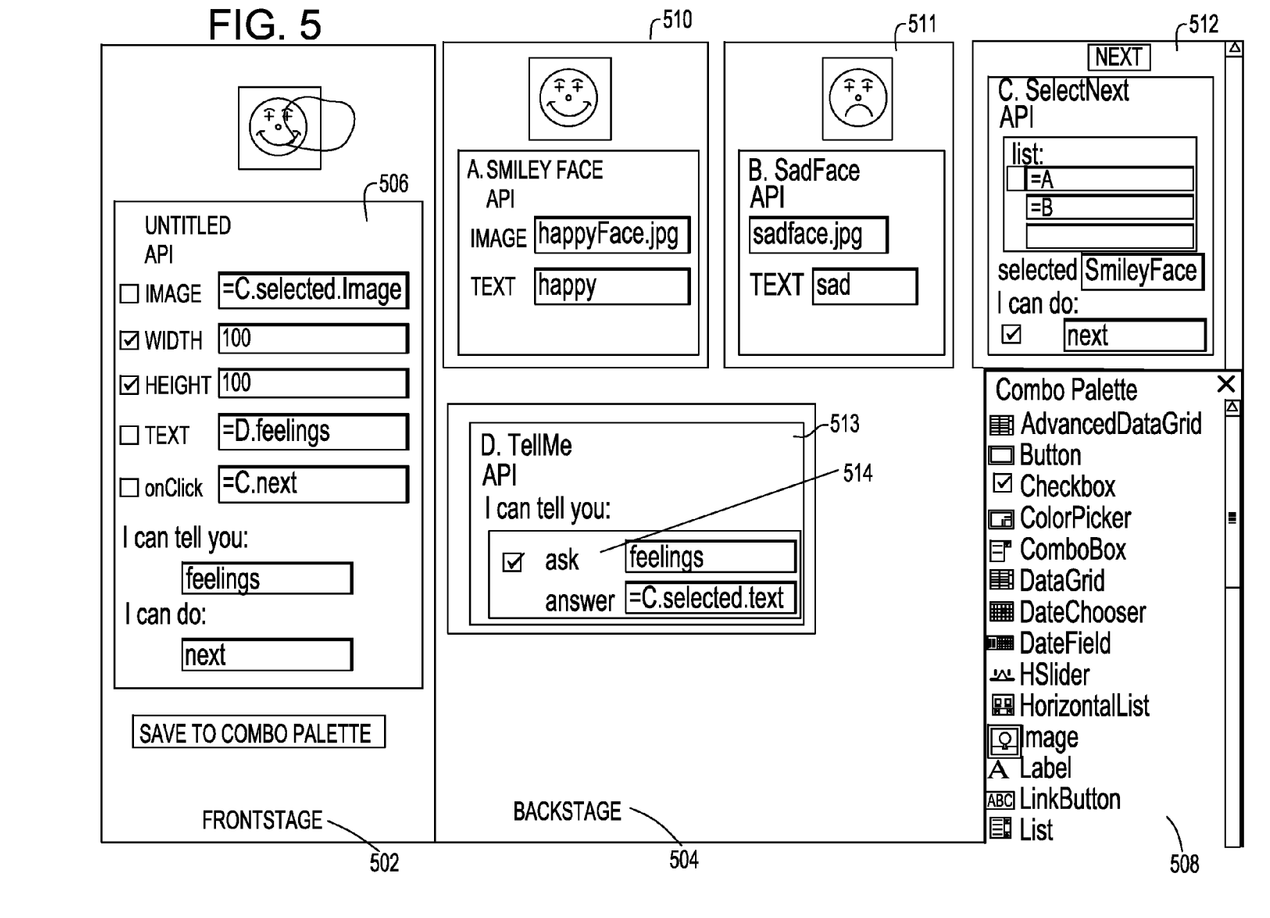
FIG. 5 shows one embodiment of a user interface for the API composer of the present disclosure in one embodiment.

FIG. 5 shows one embodiment of a user interface for the API composer of the present disclosure in one embodiment. API composer refers to a tool or functionality provided in the present application for allowing the composition of an API, and for generating an API for widgets and the like. A combo is opened revealing its frontstage 502 and backstage 504. The frontstage 502 contains a list of API elements 506. The backstage 504 contains combos 510, 511, 512, 513 that have already been added to the opened combo. In this embodiment, existing combos are presented on a palette 508, and can be added to the combo being composed using drag and drop functionality provided in the user interface of the API composer.

When an existing combo in the palette 508 is added to the frontstage 502 of the combo being composed, any API elements in the added code combo are added to the combo "API element list." In this embodiment, these elements along with their values are also displayed in the API elements area 506, of the frontstage 502. When an existing combo is added to the backstage 504 of the open combo, for example, by dragging and dropping from the palette 508, the existing combo is added to the backstage combo list, but the API elements of the added combo are not added to the API element list of the open combo. In this embodiment, the added combo is displayed on the backstage of the combo, along with its API elements and any values. APIs of combos on the backstage are not automatically added to the API of the saved combo by default. They implement functionality internal to the combo, but this is not exposed in the resulting combo by default. The combo author can choose to expose API elements such as attributes or functions that are on the backstage, but it does not happen by default. Similarly, the combo author can choose to hide API elements from combos added to the frontstage, but this does not happen by default.

The system and method of the present disclosure in one embodiment also allow API elements on the backstage of the combo to be moved to the frontstage. This may be done by dragging the API element 514 to the frontstage 502. The system and method of the present disclosure in one embodiment also allow for hiding API elements from the combo API list shown on the frontstage. This may be done by unchecking the checkbox next to the element. Unchecked API elements that are on the frontstage are not saved as part of the combo API. It is also possible to remove API items from the frontstage API list by selecting them and pressing a delete button or like. Any other forms of user interface may be used to implement such functionalities, including but not limited to using menu items, radio buttons, key combination, etc.

Figure 1:
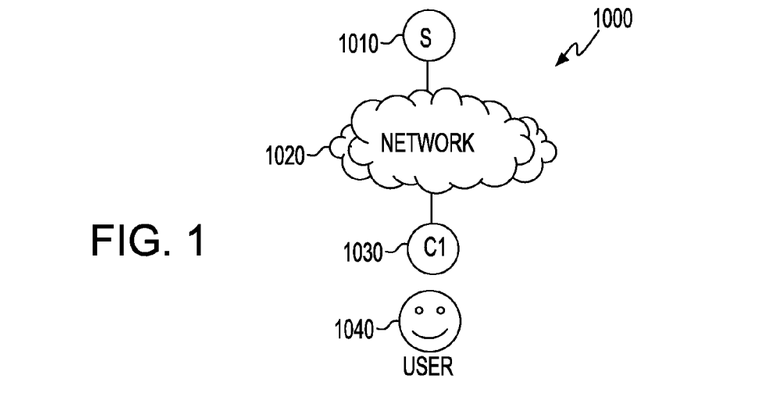
FIG. 1 is an overview of an example of the API composer service network topology of one embodiment of the present disclosure.

FIG. 1 shows an example of a network topology 1000 in one embodiment that supports the system and method of the present disclosure. As illustrated, there is a client node 1030 from which the user 1040 can access the API composer via a network 1020 using server node 1010. Server 1010 will be described in detail with reference to FIGS. 2-5. One skilled in the art will appreciate that although only one client node (1030) is shown in FIG. 1, there may be any number of such client nodes. The network 1020 may include, but is not limited to, the Internet, an internal intranet, or a wireless on wired telecommunication network. In one embodiment of the system and method of the present disclosure, the server acts as a web server (an HTTP server), communicating over the network 1020 to the client 1040, the client being any device able to act or run a web browser (HTTP client) and communicate over the network 1020. Examples include an IBM Think-Pad® running a browser software such as Windows Internet Explorer™, or an Apple iPhone™ running Apple's Safari™.

Figure 2:
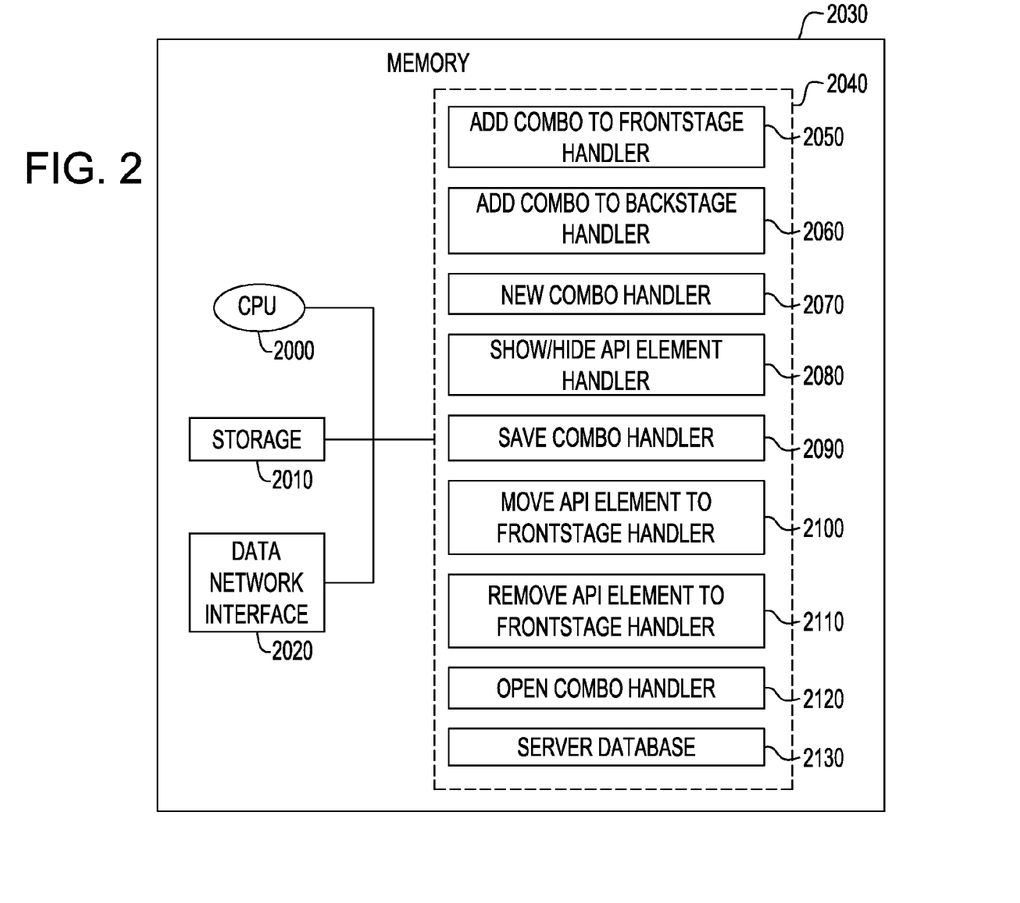
FIG. 2 is an illustrative component block diagram showing an example of an API composer server in one embodiment of the present disclosure.

FIG. 2 shows a block diagram of an API composer server 1010 in one embodiment of the present disclosure. This system 1010 may include any computing node that is able to load and execute programmatic code, including, but not limited to: products sold by IBM such as ThinkPad® or PowerPC®, running the operating system and server application suite sold by Microsoft, e.g., Windows® XP, or a Linux operating system. The system logic 2040 is preferably embodied as computer executable code that is loaded from a remote source (e.g., from a network file system), local permanent optical (CD-ROM), magnetic storage (such as disk), or storage 2010 into memory 2030 for execution by a central processing unit ("CPU") 2000 or like. The API composer server 1010 also includes a data network interface card 2020, through which the API composer server 1010 can communicate. Such an interface 2020 may include, but is not limited to, a hardwired one, e.g., Ethernet over coax cable, wireless IP, and telephone to IP (VoIP), such as that provided by the DVG-1402S Broadband Phone Service VoIP Router from D-Link®. As will be discussed in greater detail below, the memory 2030 may include computer readable instructions, data structures, program modules and application interfaces comprising the following functionalities or functional components:

an add combo to frontstage handler 2050, described in detail with reference to FIG. 4,
an add combo to backstage handler 2060,
a new combo handler 2070,
a show/hide API element handler 2080,
a save combo handler 2090,
a move API element to frontstage handler 2100,
a remove API element from frontstage handler 2110,
an open combo handler 2120, and
a server database 2130.

A handler may be implemented as a program logic, instructions or module or the like. In one embodiment, the add combo to frontstage hander (2050) has one parameter: uniqueComboID. This uniqueComboID could be a URL or other unique reference or like that is known by those skilled in the art or will be known. The frontstage hander (2050) adds the combo referenced by the uniqueComboID to the frontstage combo list of the combo being composed, and then checks to see if the combo referred to by the uniqueComboID has an existing API list. If it does it loops through the elements in the API list and adds each element to the API element list of the combo being composed.

In one embodiment, the add combo to backstage handler (2060) has one parameter: uniqueComboID. The add combo to backstage handler (2060) adds the combo referred to by the uniqueComboID to the backstage combo list of the combo being composed.

The new combo handler (2070) creates a new combo with a uniqueComboID containing an empty frontstage combo list, a backstage combo list, an API element list and a hidden API element list. It returns the uniqueComboID. Initially these internal lists are empty.

The show/hide API element handler (2080) has apiElement as a parameter. It checks to see if the apiElement specified as a parameter is already in the API element list. If the apiElement specified as a parameter is already in the API element list, the show/hide API element handler (2080) removes the apiElement from the list and adds it to the hidden API element list. Otherwise, the show/hide API element handler (2080) adds the element to the API element list, and removes it from the hidden API element list. This allows an element in an API list of a combo to be hidden or shown, which determines whether the element will be included in the API of the saved combo. Hidden elements are not saved as part of the API.

The save combo handler (2090) saves the combo being composed to a data store, e.g., storage 2010, so it is available for reuse. The save combo handler (2090) saves the combo, for example by adding the uniqueComboID along with an automatically generated description of the API elements in the API element list to database. Any other known or will be known methods may be used to save the combo to a storage device.

The move API element handler (2100) moves an API to the frontstage. This functionality allows a user to move an API element (e.g., 514) from the API list of a combo on the backstage to the API list 506 of the frontstage combo. In one embodiment, this may be done by dragging the element, but it could be implemented using other user interaction techniques known to those skilled in the art, or will be known, such as a pop-up menu with a "move" choice.

The remove API element handler (2110) has apiElement as a parameter. It checks whether the element is in the API element list. If the element is in the API element list, the remove API element handler (2110) removes the API element from the API element list of the combo being composed. If it is not in the list it checks to see if the element is in the hidden API element list, if it is it removes the API element from the hidden API element list of the combo being composed.

The open combo handler (2120) has uniqueComboID as a parameter. This handler opens the combo indicated by the uniqueComboID in the API composer. This handler also updates the display to reflect the contents of the frontstage and backstage combo list and the API element list and hidden API element list.

The above describes handlers are shown as examples of functional components in the present disclosure. One or more or combinations of modules may implement those functionalities.

The memory 2030 may also include the server database 2120, in one embodiment, which provides for the creation, deletion and modification of persistent data (such as the combo, its frontstage and backstage combo list and its API element list), and is used by the handlers 2050-2090 of the API composer service server 1010. An example of a product providing such function includes IBM DB/2 database system.

Figures 3, 4:
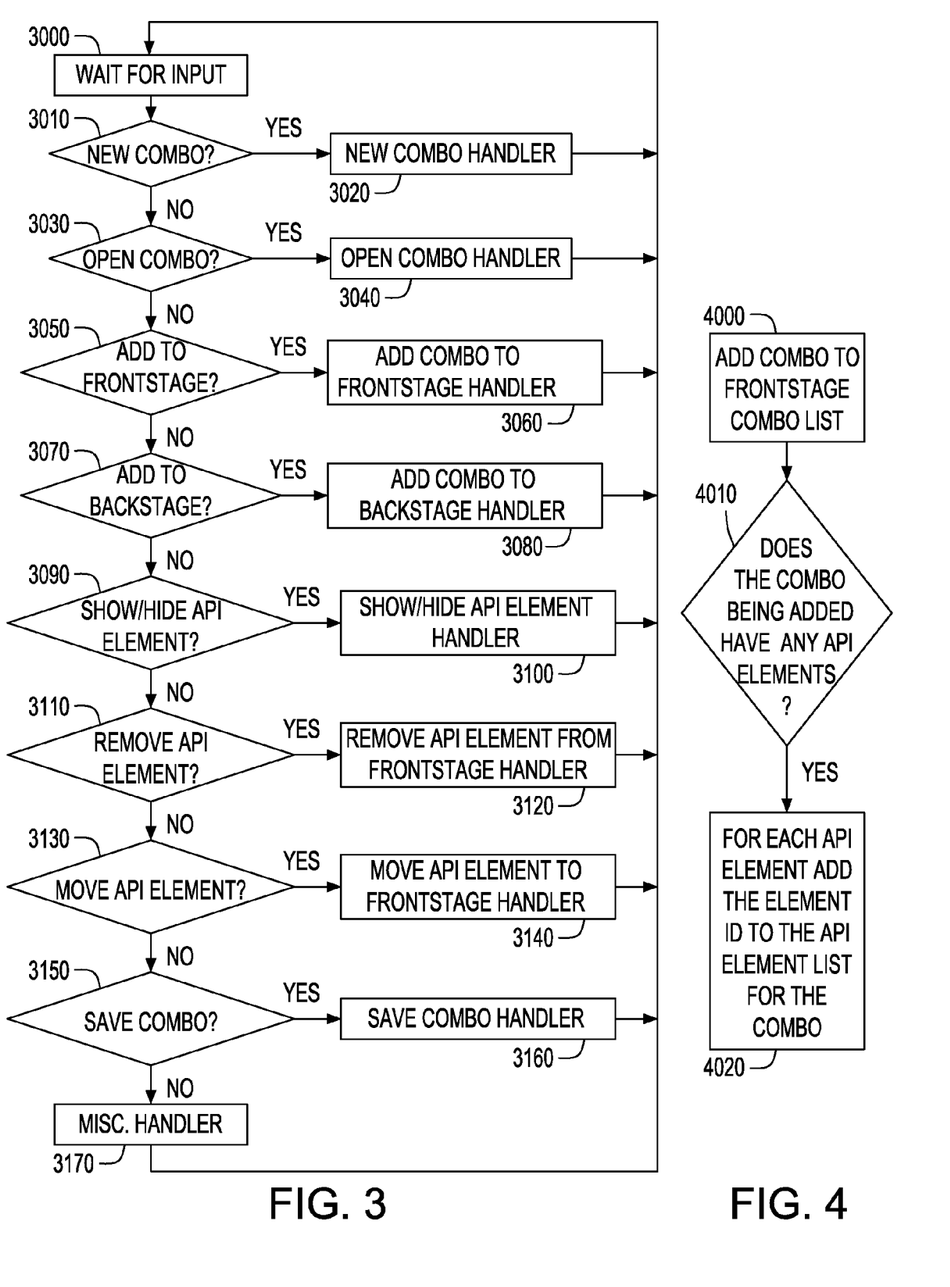
FIG. 3 is a flow diagram illustrating the flow control of an API composer server in one embodiment of the present disclosure.
FIG. 4 is a flow diagram illustrating the add combo to frontstage handler logic in one embodiment of the present disclosure.

FIG. 3 is a flow diagram illustrating the control flow of the API composer server's logic 2040 in one embodiment of the present disclosure. At step 3000, the server 1010 waits for inputs. When such an input is received, step 3010 checks whether it is a new combo request from a client node 1030 (FIG. 1). If a new combo request is received, then the new combo handler 2070 is invoked in step 3020, to create a new empty combo and associated data structures and data stores, following which, control continues at step 3000. If the input is not a new combo request, then step 3030 checks whether it is an open combo request. If an open combo request is received, the open combo handler 2120 is invoked in step 3040, following which control continues at step 3000. If the input is not an open combo request, then step 3050 checks whether it is an add to frontstage request. If the request is an add to frontstage request, the add combo to frontstage handler 2050 is invoked in step 3060, following which control continues at step 3000. If the input is not an add to frontstage request, then step 3070 checks whether it is an add to backstage request. If the request is an add to backstage request, the add combo to backstage handler 2060 is invoked in step 3080, following which, control continues at step 3000.

If the input is not an add to backstage request, then step 3090 checks whether it is a show/hide API element request. If so, the show/hide API element handler 2080 is invoked in step 3100, following which control continues at step 3000. If the input is not a show/hide API element request, then step 3110 checks to see if it is a remove API element request. If the request is a remove API element request, the remove API element from frontstage handler 2110 is invoked in step 3120, following which, control continues at step 3000. If the input is not a remove API element request, then step 3130 checks to see if it is a move API element request. If the request is a move API element request, the move API element to frontstage handler 2100 is invoked in step 3140, following which control continues at step 3000. If the input is not a move API element request, then step 3150 checks to see if it is a save combo request. If the request is a save combo request, the save combo handler 2090 is invoked in step 3160, following which, control continues at step 3000. If the input is not a save combo request, then a miscellaneous handler is invoked in step 3170, following which control continues at step 3000. Miscellaneous handler may handles request other than those described above as appropriate.

FIG. 4 is a flow diagram illustrating the control flow of the add combo to frontstage handler 2050 in one embodiment of the present disclosure, which is responsible for adding a combo to the frontstage of a combo being composed. When an add combo to frontstage request is received, step 4000 adds the combo to the frontstage combo list of the combo being composed, and then passes control onto step 4010 which checks whether the combo has any API elements in the API element list. If so, then for each API element in the API element list of the combo being added, it performs step 4020, to add the API element to the API element list of the combo being composed, after which the handler returns.

Figure 6:
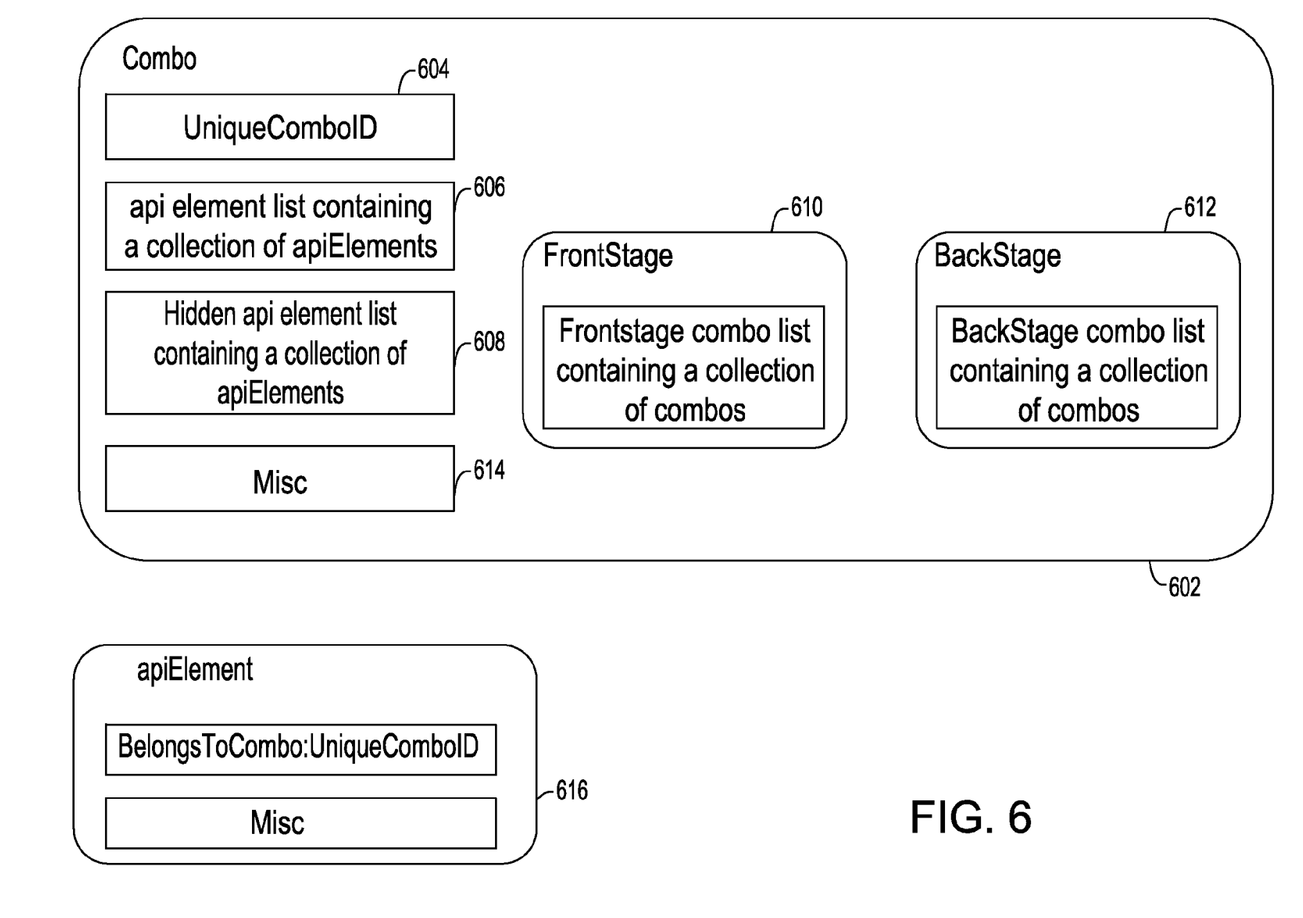
FIG. 6 illustrates API composer object design in one embodiment of the present disclosure.

FIG. 6 illustrates API composer object design in one embodiment of the present disclosure. A combo may be represented as an object 602 or the like or another data structure, comprising a unique combo identifier 604, an API element list 606, a hidden API element list 608, frontstage 610, backstage 612, and miscellaneous elements 614. Frontstage element 610 may include a list of combos in the frontstage component. Backstage element 612 may include a list of combos in the backstage component. In this disclosure, the terms "frontstage" and "backstage" may refer to a user interface display or like components such as a window, a frame or a panel or others that show or otherwise present frontstage and backstage elements, if they are described with respect to user interface displays or the like; those terms "frontstage" and "backstage" may also refer to computer data structure objects or the like or related functionalities, if they are described with respect to data elements and attributes and functions.

An apiElement object 616 has its owner, i.e., identification of the combo that owns the apiElement and miscellaneous information. Using the system and method of the present disclosure, APIs for code modules may be generated by selecting and/or combining existing apiElement objects and associating those apiElement objects with a code module, for which an API is being generated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
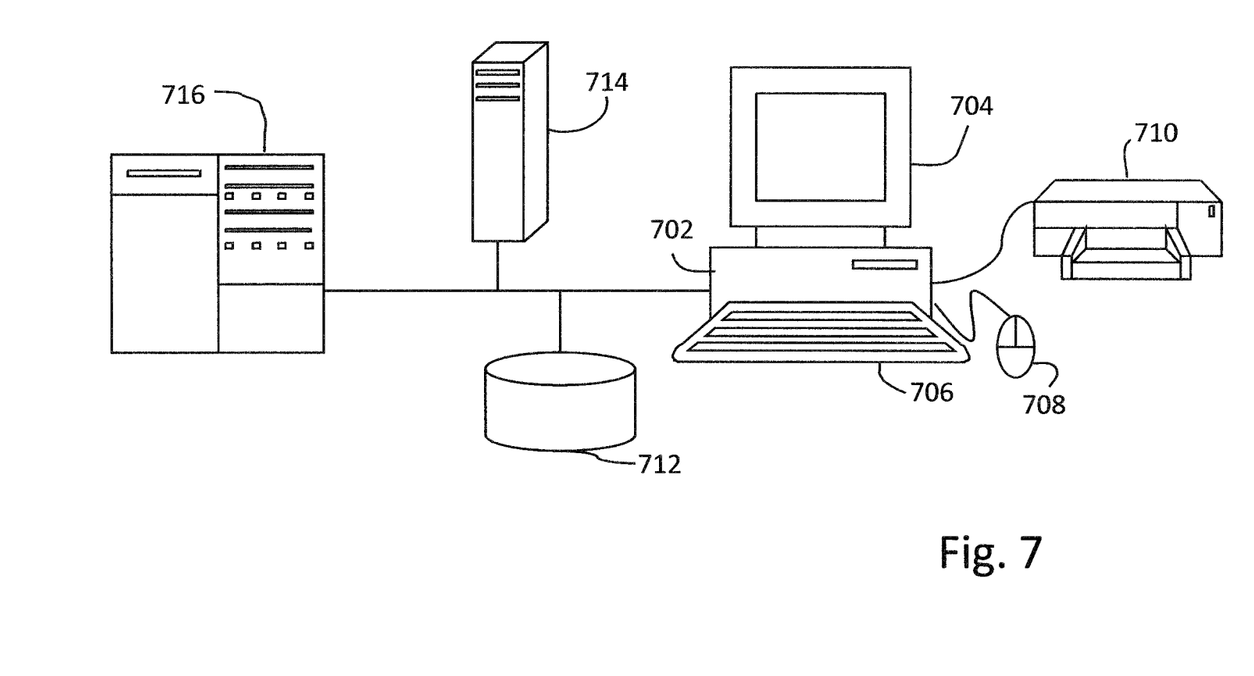
FIG. 7 illustrates an example of a computer system, in which the systems and methodologies of the present disclosure may be carried out or executed.

Referring now to FIG. 7, the systems and methodologies of the present disclosure may be carried out or executed in a computer system that includes a processing unit 702, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 702 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 704 for presenting output displays and providing a display through which the user may input data and interact with the processing system, for instance, in cooperation with input devices such as the keyboard 706 and mouse device 708 or pointing device. The computer processing system may be also connected or coupled to one or more peripheral devices such as the printer 710, scanner (not shown), speaker, and any other devices, directly or via remote connections. The computer processing system may be connected or coupled to one or more other processing systems such as a server 710, other remote computer processing system 714, network storage devices 712, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 702, 714, 716), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for creating an Application Programming Interface (API) for a code module to be used in a computer system, the method comprising:
    creating a new module by composing one or more existing modules by a processor; and
    defining an API for the new module using a set of API elements of said one or more existing modules,
    wherein each of the one or more existing modules comprises a combo comprising unique combo identifier, an API element list comprising a collection of API elements, a hidden API element list comprising a collection of API elements that are not presented with the combo, a frontstage object comprising a frontstage combo list comprising a collection of combos and a backstage object comprising a backstage combo list comprising a collection of combos.

2. The method of claim 1, further including:
    establishing a computer-implemented user interface via which said steps of creating and defining are performed.

3. The method of claim 2, wherein the user interface presents a list of existing modules and said one or more existing modules are selected from the list.

4. The method of claim 2, wherein the step of defining includes adding one or more API elements of said one or more existing modules to API element list of said new module.

5. The method of claim 2, wherein the user interface provides a frontstage component and a backstage component, the frontstage component to create and define a new module using existing APIs of said one or more existing modules in the backstage component.

6. The method of claim 5, the backstage component includes a list of existing modules and one or more saved modules, wherein said one or more existing modules are selected from the list of existing modules, and the new module is created in the frontstage component using the selected one or more existing modules and associated APIs.

7. The method of claim 1, further including saving the new module for reuse.

8. A system for creating an Application Programming Interface (API) for a code module to be used in a computer system, comprising:
    a memory;
    a user interface comprising a frontstage component and a backstage component, and a list of existing modules from which one or more existing modules are selected to create a new module, the frontstage component comprising the new module being created;

an add combo to frontstage handler operable to add a combo to a list of combos for creating said new module in the frontstage component, the frontstage handler further operable to add a list of APIs associated with the combo to a list of APIs in the frontstage component for creating said new module;

an add combo to backstage handler operable to add said new module to a list of combos in the backstage;

a new combo handler operable to open an empty list of combos in the frontstage component, an empty list of APIs in the frontage, and an empty list of combos in the backstage component;

a save combo handler operable to save said new module to a data store; and a remove API element handler operable to remove one or more API elements from the list of APIs in the frontstage, wherein each of the one or more existing modules comprises a combo comprising unique combo identifier, an API element list comprising a collection of API elements, a hidden API element list comprising a collection of API elements that are not presented with the combo, a frontstage object comprising a frontstage combo list comprising a collection of combos and a backstage object comprising a backstage combo list comprising a collection of combos.

9. The system of claim 8, further including:

an open combo handler operable to open the user interface having the frontstage component and the backstage component for composing said new module and associated APIs.

10. The system of claim 8, further including:

a show and hide API element handler operable to display and hide from display a selected API element.

11. The system of claim 8, further including:

a move API element to frontstage handler operable to copy one or more API elements from the backstage component to the frontstage component.

12. A non-transitory program storage device readable by a machine, tangibly embodying a program of instructions executable by the machine to perform a method of creating an Application Programming Interface (API) for a code module to be used in a computer system, the method comprising:

creating a module by composing one or more existing modules; and defining an API for the module using a set of API elements of said one or more existing modules, wherein each of the one or more existing modules comprises a combo comprising unique combo identifier, an API element list comprising a collection of API elements, a hidden API element list comprising a collection of API elements that are not presented with the combo, a frontstage object comprising a frontstage combo list comprising a collection of combos and a backstage object comprising a backstage combo list comprising a collection of combos.

13. The program storage device of claim 12, further including:

establishing a computer-implemented user interface via which said steps of creating and defining are performed.

14. The program storage device of claim 13, wherein the user interface presents a list of existing modules and said one or more existing modules are selected from the list.

15. The program storage device of claim 13, wherein the step of defining includes adding one or more API elements of said one or more existing modules to API element list of said new module.

16. The program storage device of claim 13, wherein the user interface provides a frontstage component and a backstage component, the frontstage component to create and define a new module using existing APIs of said one or more existing modules in the backstage component.

17. The program storage device of claim 16, the backstage includes a list of existing modules and one or more saved modules, wherein said one or more existing modules are selected from the list of existing modules, and the new module is created in the frontstage component using the selected one or more existing modules and associated APIs.

18. The program storage device of claim 12, further including saving the new module for reuse.

* * * * *